United States Patent [19]

Izumi et al.

[11] Patent Number: 4,531,369
[45] Date of Patent: Jul. 30, 1985

[54] FLUSHING VALVE SYSTEM IN CLOSED CIRCUIT HYDROSTATIC POWER TRANSMISSION

[75] Inventors: Eiki Izumi; Hiroshi Watanabe; Yukio Aoyagi; Kazuo Honma; Kichio Nakajima, all of Ibaraki, Japan

[73] Assignee: Hitachi Construction Machinery Co., Ltd., Tokyo, Japan

[21] Appl. No.: 351,756

[22] Filed: Feb. 24, 1982

[30] Foreign Application Priority Data

Mar. 2, 1981 [JP] Japan ................................. 56-28346

[51] Int. Cl.³ ............................................. F16D 31/02
[52] U.S. Cl. ....................................... 60/456; 60/461; 60/464; 60/468
[58] Field of Search ................. 60/461, 464, 468, 456; 91/420; 137/106, 112

[56] References Cited

U.S. PATENT DOCUMENTS

| 776,061 | 11/1904 | Hewett | 137/112 |
|---|---|---|---|
| 2,365,095 | 12/1944 | Miller et al. | 137/106 |
| 2,634,743 | 4/1953 | Audemar | 137/112 |
| 3,274,902 | 9/1966 | Kleckner | 91/420 |
| 3,381,587 | 5/1968 | Parquet | 91/420 |
| 3,472,261 | 10/1969 | Brannon | 91/420 |
| 3,866,421 | 2/1975 | Kersten et al. | 60/464 |
| 3,910,303 | 10/1975 | Rydberg | 137/112 |
| 3,925,987 | 12/1975 | Faisandier | 60/464 |
| 3,939,656 | 2/1976 | Goldfein | 60/456 |
| 4,342,256 | 8/1982 | Andersen et al. | 91/420 |
| 4,343,153 | 8/1982 | Kern et al. | 60/476 |
| 4,362,018 | 12/1982 | Torii | 60/468 |

FOREIGN PATENT DOCUMENTS

0004540 10/1979 European Pat. Off. .
2262036 6/1974 Fed. Rep. of Germany ...... 137/112

OTHER PUBLICATIONS

W. Backe, "Systematik der Hydraulischen Widerstandsschaltungen", 1974, Germany, pp. 184 to 189.

*Primary Examiner*—Sheldon J. Richter
*Assistant Examiner*—Randolph A. Smith
*Attorney, Agent, or Firm*—Antonelli, Terry & Wands

[57] ABSTRACT

A flushing valve system suitable for use in a closed circuit hydrostatic transmission including a variable displacement hydraulic pump, a hydraulic actuator and two main lines. The flushing valve system includes poppet valves mounted in passages for respectively communicating the main lines with a fluid tank, passages mounting throttles for causing the pressure in the main lines to act on pressure chambers to keep poppets of the poppet valves from moving to an open position, and a change-over valve responsive to the pressure differential between the main lines to communicate the pressure chamber of the poppet valve connected to the main line on the lower pressure side with the fluid tank. The poppet valve connected to the main line on the lower pressure side opens when a predetermined pressure level is exceeded by the pressure in the main line, to thereby allow working fluid in the main line to be drained to the fluid tank.

6 Claims, 5 Drawing Figures

FLUSHING VALVE SYSTEM IN CLOSED CIRCUIT HYDROSTATIC POWER TRANSMISSION

BACKGROUND OF THE INVENTION

This invention relates to closed circuit hydrostatic power transmissions comprising a variable displacement hydraulic pump and a hydraulic actuator connected to each other in a closed hydraulic circuit, and, more particularly, to a flushing valve system used in a closed circuit hydrostatic power transmission of, for example, hydraulic power shovels, which flushing valve system is operative in cooperation with fluid replenishing means, such as a charge pump, to replace the working fluid in the closed hydraulic circuit with a fresh supply of fluid.

Heretofore, a closed circuit hydrostatic power transmission is provided with a spool type flushing valve including two inlet ports each connected to one of two main lines of the closed hydraulic circuit, one outlet port connected to a working fluid reservoir or tank, and a spool having two ends each receiving a pressure from one of the two main lines and moved by the pressure differential to a position in which one of the two inlet ports is allowed to communicate with the outlet port. This type of flushing valve permits, when a predetermined pressure differential is produced between the two main lines, the inlet port connected to the main line of the higher pressure side to be blocked by the spool and the main line of the lower pressure side to be communicated with the tank, so as to discharge a portion of the working fluid in the main line into the tank.

In a spool type flushing valve of the prior art, it has been usual practice to have a large stroke of the spool, both to prevent the hydraulic motor from slipping due to pressure fluid leaks from the main line on the high pressure side through a gap between the body and spool of the flushing valve, and to increase the area of a passage between the inlet port communicating with the main line on the lower pressure side and the outlet port connected to the tank. Thus, the spool of the flushing valve of the prior art to has a long switching time when shifting from a first position, in which it allows the one inlet port to communicate with the outlet port, to a second position, in which it allows the other inlet port to communicate with the outlet port. It sometimes happens in a closed circuit hydrostatic power transmission that the internal pressures of the main lines suddenly show a change. For example, when pressure fluid is supplied from a hydraulic pump to a hydraulic motor connected to a load of high inertia to drive same, the main line connected to the discharge side of the hydraulic pump becomes a higher pressure side main line and the main line connected to the suction side thereof becomes a lower pressure side main line. If an attempt is made to suddenly decrease the volume of hydraulic fluid delivered by the hydraulic pump to stop rotation of the hydraulic motor, then the hydraulic motor would be driven by the inertia of the load connected to the hydraulic motor. This would result in the main line connected to the pump suction side that has been a lower pressure side main line becoming, for an instant, a higher pressure side main line and the main line connected to the pump discharge side that has been a higher pressure side main line becoming, for an instant, a lower pressure side main line. The flushing valve of the prior art has been unable to follow these sudden changes in the internal pressures of the main lines, so that even after the lower pressure side main line becomes a high pressure side main line, the main line still remains in communication with the tank through the flushing valve. Thus, working fluid of high pressure would be discharged into the tank and the hydraulic motor would continue to rotate without stopping.

Furthermore, in spite of the fact that the variable displacement hydraulic pump has decreased the volume of pressure fluid delivered thereby, the hydraulic motor tries to rotate at a velocity at which it has been rotating up to then, so that the pressure fluid flowing into the hydraulic motor would be reduced in volume and the pressure in the main line connected to the pump discharge side would become negative or subatmospheric, so that cavitation might develop and cause damage to the hydraulic motor. To avoid this accident, it has been usual practice to increase the volume of a charge pump for replenishing the main lines with pressure fluid to a level high enough to avoid the development of cavitation or to decrease the changing rate of the volume of pressure fluid delivered by the variable displacement hydraulic pump. However, an increase in the capacity of the charge pump is not desirable because it increases energy losses and increases limitations to be placed on designing. A decrease in the changing rate of the volume of pressure fluid delivered by the variable displacement hydraulic pump reduces its operational ability.

SUMMARY OF THE INVENTION

Accordingly, an object of the present invention is to provide a novel flushing valve system which is free from the aforesaid disadvantages of the prior art, and has a high switching speed and low pressure fluid leak level.

According to the invention, there is provided, in a closed circuit hydrostatic power transmission comprising a variable displacement hydraulic pump, a hydraulic actuator, first and second main lines connecting the variable displacement hydraulic pump and the hydraulic actuator together in a closed hydraulic circuit, a fluid tank, and fluid replenishing means connected to the first and second main lines for replenishing them with working fluid from the fluid tank, a flushing valve system interposed between the first and second main lines and the fluid tank and operative, when a predetermined level of pressure differential is produced between the first and second main lines, to bring the main line on the lower pressure side into communication with the fluid tank and the main line on the higher pressure side out of communication therewith. The flushing valve system comprises a first poppet valve located between the first main line and the fluid tank for bringing them into and out of communication with each other, a second poppet valve located between the second main line and the fluid tank for bringing them into and out of communication with each other, and pressure differential responding means responsive to the pressure differential between the first and second main lines to bring the poppet valve communicating with the main line on the higher pressure side to a closed condition, and the poppet valve communicating with the main line on the lower pressure side to an openable condition.

Additional and other objects, features and advantages of the invention will become apparent from the description set forth hereinafter when considered in conjunction with the accompanying drawings.

DETAILED DESCRIPTION OF THE PREFERRED EMBODIMENTS

Figure 1:
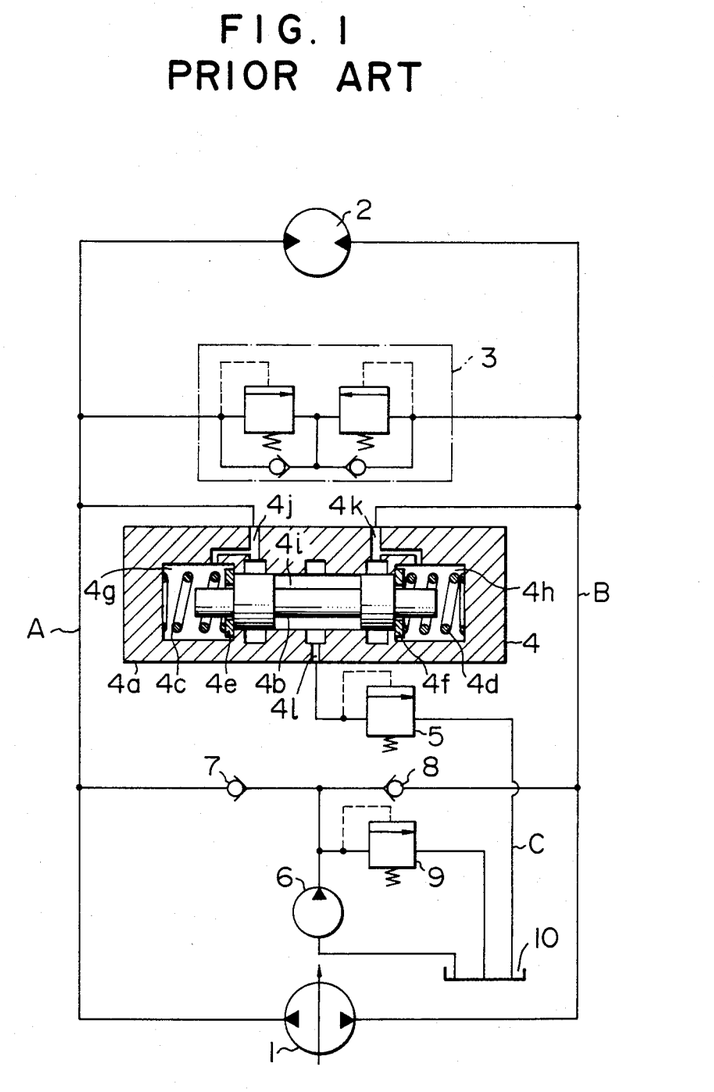
FIG. 1 is a hydraulic circuit diagram of a closed circuit hydrostatic power transmission using a flushing valve of the prior art.

Referring now to the drawings wherein like reference numerals are used throughout the various views to designate like parts and, more particularly, to FIG. 1, according to this figure, closed circuit hydrostatic power transmission, including a prior art flushing valve, comprises a variable displacement hydraulic pump 1, a hydraulic actuator or a hydraulic motor 2, and two main lines A and B connecting the pump 1 and the motor 2 together in a closed hydraulic circuit. The two main lines A and B have connected thereto a crossover relief valve 3 for regulating the internal pressures of the two main lines A and B to keep same from exceeding a predetermined allowable maximum pressure, and a flushing valve 4 for bringing one of the two main lines A and B into communication with a low-pressure line C communicating with a fluid tank 10 and having a relief valve 5 mounted therein. The two main lines A and B further have connected thereto fluid replenishing means comprising a charge pump 6, check valves 7 and 8 and a charge-pressure-setting relief valve 9. The flushing valve 4 comprises a body 4a, a spool 4b, springs 4c and 4d, seats 4e and 4f, pressure chambers 4g and 4h, an outlet chamber 4i, inlet ports 4j and 4k and an outlet port 4l. Assume, for example, that the variable displacement hydraulic pump 1 is actuated to drive the hydraulic motor 2 and the main line A becomes a main line on the high pressure side, then a pressure differential is produced between the pressure chambers 4g and 4h which causes the spool 4b to shift to the right in FIG. 1. This brings the inlet port 4j out of communication with the outlet port 4l and the inlet port 4k into communication with the outlet port 4l through the outlet chamber 4i. Thus, the main line A is blocked and the main line B is communicated with the low-pressure line C having the relief valve 5 mounted therein. As the internal pressure of the main line B becomes higher than the pressure level at which the relief valve 5 is set, the pressure fluid in the main line B is returned to the fluid tank 10. Meanwhile, as the internal pressure of the main line A or B becomes lower than the pressure level at which the relief valve 9 is set, pressure fluid is freshly supplied to the main line A or B through the check valve 7 or 8 by the charge pump 6. Since the pressure level at which the relief valve 9 is set is higher than the pressure level at which the relief valve 5 is set, the charge pump 6 positively supplies pressure fluid to the main line A or B on the lower pressure side, while the pressure fluid discharged from the hydraulic motor 2 is returned to the fluid tank 10 through the flushing valve 4 in a volume equal to the replenishment, thereby effecting a fluid replacement.

As described hereinabove, due to the spool type flushing valve 4 of the prior art having an elongated spool, it has a prolonged switching time and, consequently the hydrostatic power transmission has a low response characteristic and may develop cavitation. An added disadvantage is that it is necessary to use a charge pump of a large size.

Figure 2:
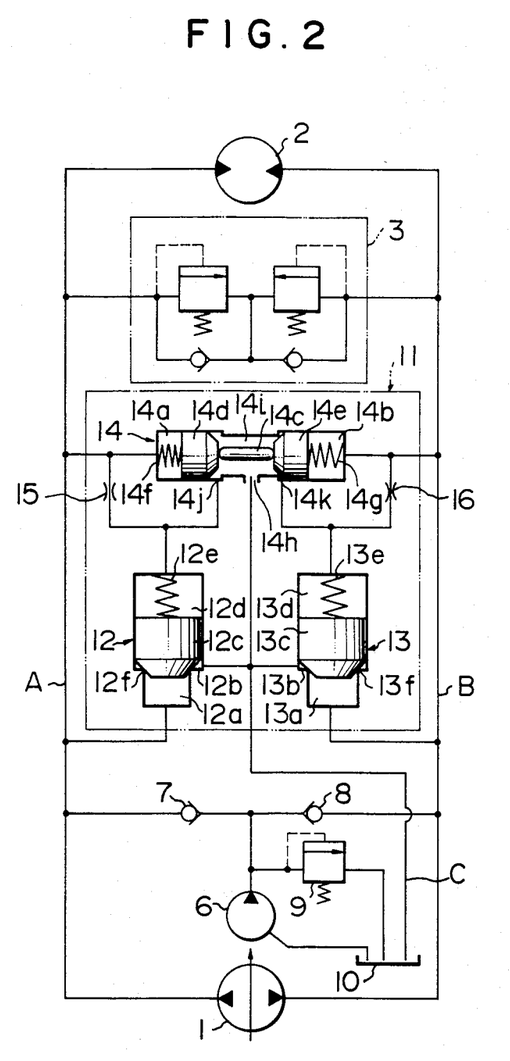
FIGS. 2–5 are hydraulic circuit diagrams of embodiments of the present invention.

Referring to FIG. 2, a flushing valve system of the present invention generally designated by the reference numeral 11 comprises two poppet valves generally designated by the reference numerals 12 and 13, a change-over valve generally designated by the reference numeral 14 and two throttles 15 and 16. The poppet valves 12 and 13 comprises inlet chambers 12a and 13a connected to the main lines A and B, respectively, outlet chambers 12b and 13b both connected to the low-pressure line C, valve seats 12f and 13f, poppets 12c and 13c cooperating with the valve seats 12f and 13f for bringing the inlet chambers 12a and 13a into and out of communication with the outlet chambers 12b and 13b, respectively, pressure chambers 12d and 13d establishing pressures acting on the poppets 12c and 13c to urge the same toward the valve seats 12f and 13f, respectively, and springs 12e and 13e forcing the poppets 12c and 13c toward the valve seats 12f and 13f, respectively. The poppets 12c and 13c are arranged such that they are urged by the internal pressures of the inlet chambers 12a and 13a in a direction away from the valve seats 12f and 13f, respectively. The springs 12e and 13e are preloaded in such a manner that, with the pressure chambers 12d and 13d being in communication with the fluid tank 10, the poppets 12c and 13c are kept in contact with the valve seats 12f and 13f, respectively, until a predetermined level is exceeded by the internal pressures of the inlet chambers 12a and 13a or the main lines A and B. Stated differently, the springs 12e and 13e of the poppet valves 12 and 13 set a maximum pressure for the main line that is a main line on the lower pressure side. The pressure at which the poppet valves 12 and 13 are set to open is set at a lower level than the pressure at which the relief valve 9 of the fluid replenishing means is set to open.

The change-over valve 14 comprises pressure chambers 14a and 14b connected to the main lines A and B, respectively, two poppets 14d and 14e exposed to the pressures in the pressure chambers 14a and 14b, respectively to jostle each other through a push-rod 14c, weak springs 14f and 14g for restoring the poppets 14d and 14e to a neutral position when no pressure differential exists between the main lines A and B, a common port 14h connected to the low-pressure line C, a change-over chamber 14i, and change-over ports 14j and 14k connected to the pressure chambers 12d and 13d, respectively, of the poppet valves 12 and 13. The push rod 14c has a length which is set such that when one poppet 14e is in a position in which it brings the adjacent change-over port 14k out of communication with the common port 14h, the other poppet 14d is disposed in a position in which it brings the adjacent change-over port 14j into communication with the common port 14h. The throttle 15 is mounted in a passage connecting the main line A with the pressure chamber 12d of the poppet valve 12, and the throttle 16 is mounted in a passage connecting the main line B with the pressure chamber 13d of the poppet valve 13. The change-over valve 14 and the throttles 15 and 16 constitute pressure differential responding means responsive to the pressure differential between the main lines A and B to control poppet valves 12 and 13.

Operation of the embodiment constructed as shown in FIG. 2 will now be described. In the absence of pressure differential between the main lines A and B, the change-over valve 14 is in a neutral position, with the common port 14h being in communication with the two change-over ports 14j and 14k through the change-over chamber 14*i*. This brings the pressure chambers 12*d* and 13*d* of the poppet valves 12 and 13 into communication with the fluid tank 10 through the low-pressure line C. Though the pressure chambers 12*d* and 13*d* are in communication with the main lines A and B, respectively, the pressure in the pressure chambers 12*d* and 13*d* is reduced to substantially the same level as the fluid tank, because the throttles 15 and 16 produce suitable pressure drops between the main lines A and B and the pressure chambers 12*d* and 13*d*, respectively. The condition of the poppet valve 12 or 13 in which the pressure chamber 12*d* or 13*d* is connected to the fluid tank 10 and the pressure in the pressure chamber 12*d* or 13*d* is substantially the same as that of the tank 10 will be referred to as an openable condition. In this condition, as the internal pressure of the main lines A and B i.e. the internal pressure of the inlet chambers 12*a* and 13*a* rises above a cracking pressure level set by the springs 12*e* and 13*e* of the poppet valves 12 and 13, respectively, the poppets 12*c* and 13*c* are released from contact with the respective valve seats 12*f* and 13*f* to allow the inlet chambers 12*a* and 13*a* to communicate with the outlet chambers 12*b* and 13*b*, respectively, or render the poppet valves 12*a* and 13*a* open. Thus, the main lines A and B are communicated with the fluid tank 10 to allow the pressure fluid to be released into the tank 10 from the main lines A and B. This condition arises when, for example, the delivery by the hydraulic pump 1 is reduced to zero (0) and the hydraulic motor 2 is shut down while the charge pump 6 alone is operating.

Starting of operation of the hydraulic motor 2 from this condition will be described. First, the variable displacement hydraulic pump 1 is actuated in such a manner that it delivers pressure fluid to the main line A. Delivery of pressure fluid to the main line A by the hydraulic pump 1 raises the internal pressure of the main line A. Before the internal pressure of the main line A reaches the cracking pressure level of the poppet valve 12, the change-over valve 14 is caused to shift to the right in FIG. 2 by the pressure differential between the main lines A and B, to bring the pressure chamber 12*d* of the poppet valve 12 out of communication with the fluid tank 10 while the pressure chamber 13*d* of the poppet valve 13 is still in communication with the tank 10. With the pressure chamber 12*d* of the poppet valve 12 being connected to the main line A through the throttle 15, the internal pressure of the main line A is introduced into the pressure chamber 12*d*. Thus, the poppet 12*c* of the poppet valve 12 is forced against the valve seat 12*f* by a combination of the internal pressure of the pressure chamber 12*d* or the main line A and the biasing force of the spring 12*e*, thereby preventing the poppet 12*c* from being brought out of contact with the valve seat 12*f* even if the internal pressure of the inlet chamber 12*a* rises above the cracking pressure level. This condition will be referred to as a closed condition. A rise in the internal pressure of the main line A immediately brings the poppet valve 12 associated with the main line A to the closed condition, so that all the pressure fluid in the main line A is sent to the hydraulic motor 2 to rotate same. Meanwhile, the poppet valve 13 associated with the main line B is kept in the openable condition, so that the valve 13 is opened when the fresh supply of pressure fluid from the charge pump 6 raises the internal pressure of the main line B above the cracking pressure level, to allow the pressure fluid to flow from the main line B to the tank 10 through the poppet valve 13.

Suppose that the delivery by the hydraulic pump 1 is suddenly decreased in order to stop the hydraulic motor 2 when in this condition. As a result, the load that has been driven by the hydraulic motor 2 tends to drive the hydraulic motor 2 by its inertia. This suddenly raises the internal pressure of the main line B connected to the suction side of the hydraulic pump 1 and having a lower pressure and changes the main line A to a lower pressure side from a high pressure side. These changes in the internal pressures of the main lines A and B are immediately transmitted to the change-over valve 14, to thereby bring the poppet valve 12 associated with the main line A to the openable condition and the poppet valve 13 associated with the main line B to the closed condition. The poppet valves 12 and 13 have high switching speed because they can shift from full closed position to open position of large fluid passage area with a small amount of movement. Thus, the poppet valves 12 and 13 immediately bring the main line on the higher pressure side out of communication with the fluid tank 10 by quickly following up the sudden changes in the internal pressures of the main lines A and B. In this way, deceleration of the hydraulic motor 2 can be achieved by quickly responding to a sudden fall in the delivery by the hydraulic pump 1, and it is possible to avoid cavitation development in the main line on the lower pressure side which might otherwise occur due to a low amount of working fluid in the closed circuit caused by a discharge of the high pressure fluid through the flushing valve from the main line in which a sudden change in pressure from a low level to a high level has taken place, as is the case with a hydrostatic power transmission using a spool type flushing valve of the prior art. Also, since the poppet valves 12 and 13 are capable of securely shutting off the communication between the inlet chambers 12*a* and 13*a* and the outlet chambers 12*b* and 13*b* when the valves 12 and 13 are in a closed condition, the risk of the pressure fluid leaking from the main line on the higher pressure side through the poppet valve and discharged into the fluid tank 10 is eliminated.

Figure 3:
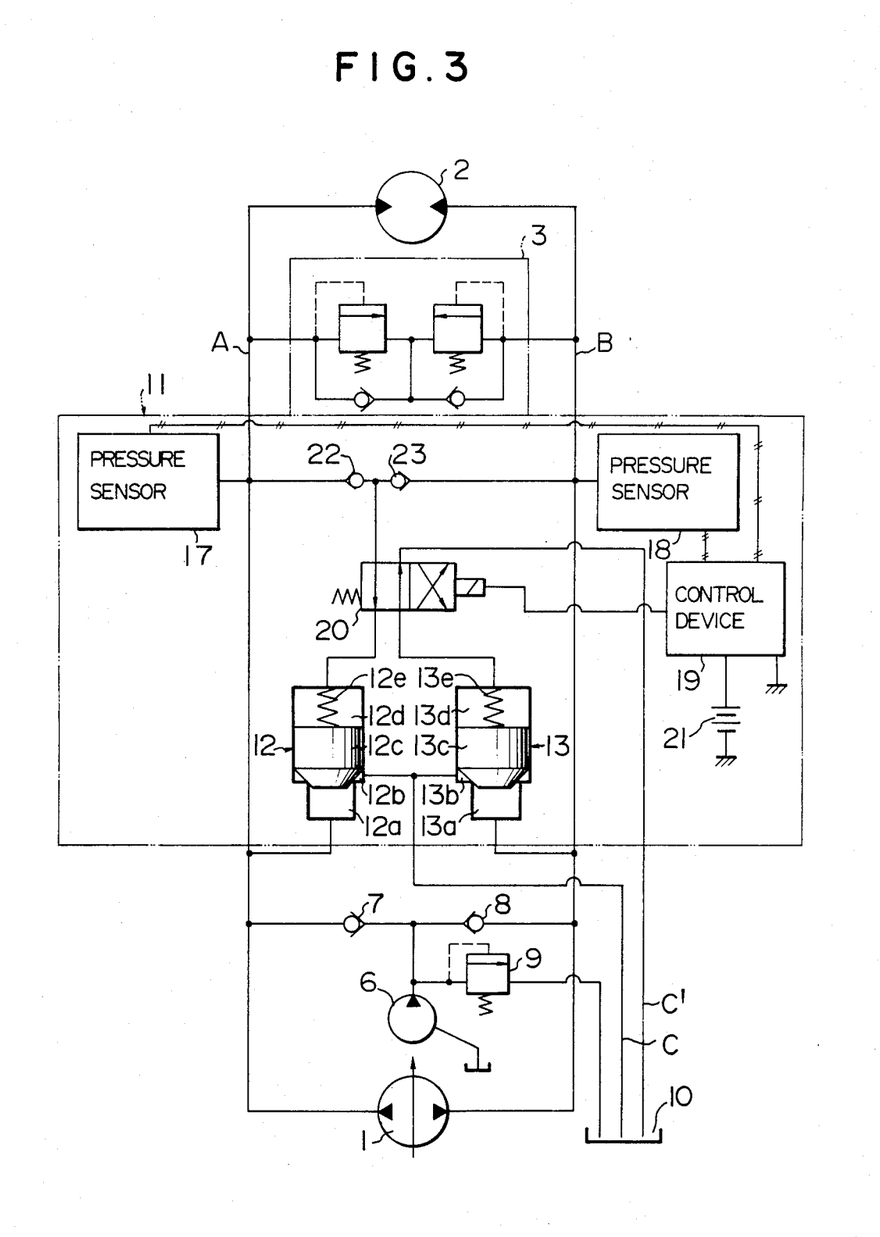

FIG. 3 shows still another embodiment of the invention in which electrically-operated means is used as the pressure differential responding means. More particularly, the pressure differential responding means comprises pressure sensors 17 and 18, a control device 19, connected to a power source 21, and a solenoid-operated directional control valve 20. The pressure sensors 17 and 18 are operative to change the internal pressures of the main lines A and B to electric signals and supply same to the control device 19 which senses pressure differential between the inputted electric signals and decides which poppet valve should be brought to the openable condition and which poppet valve to the closed condition. When the main line A is on the higher pressure side or there is no pressure differential between the main lines A and B, the control device 19 keeps the directional control valve 20 in a position shown in FIG. 3 and communicates the pressure chamber 12*d* of the poppet valve 12 with the main line A through a check valve 22 while communicating the pressure chamber 13*d* of the poppet valve 13 with the tank 10 via the low-pressure line C. When the main line B is on the higher pressure side, the control device 19 switches the directional control valve 20 from the position shown in FIG. 3 to the other position, to thereby communicate the pressure chamber 12*d* of the poppet valve 12 with the tank 10 through the low-pressure line C and the pressure chamber 13*d* of the poppet valve 13 with the main line B through a check valve 23. Thus, the poppet valve 12 or 13 communicated with the main line on the higher pressure side is brought to the closed condition and the poppet valve 13 or 12 communicated with the main line on the lower pressure side is brought to the openable condition so that it opens when the pressure in the particular main line rises above the cracking pressure level. This embodiment is capable of sensing any pressure differential, no matter how small, and switching the directional control valve 20.

Figure 4:
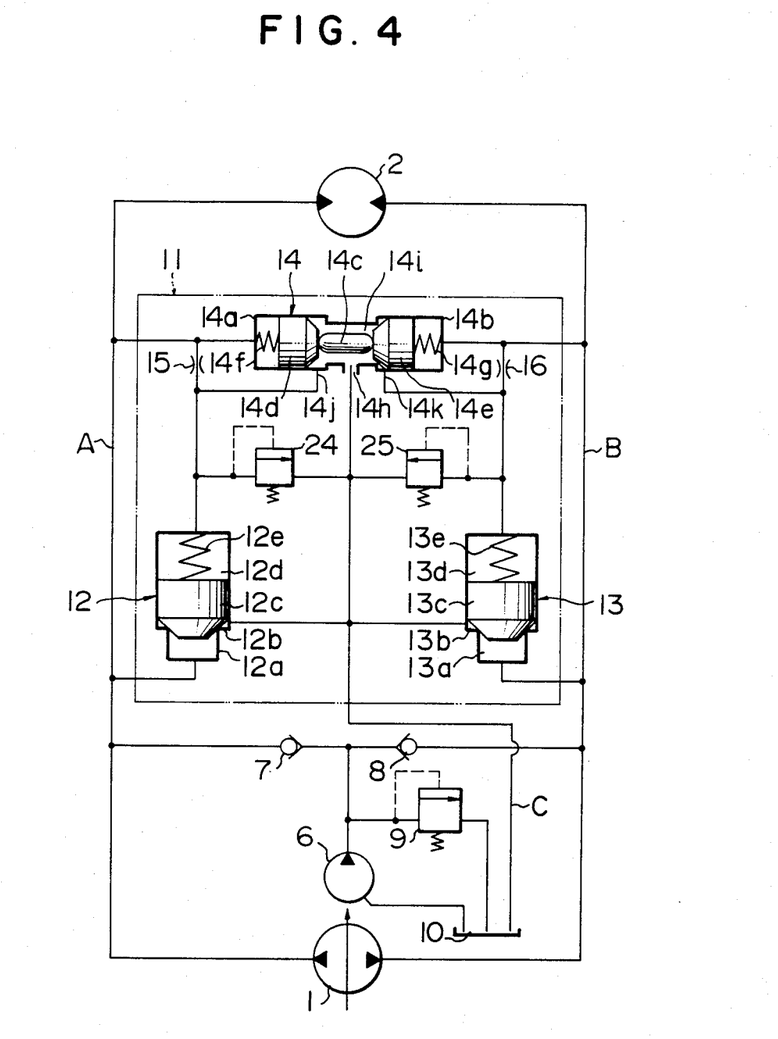

FIG. 4 shows still another embodiment of the present invention, which includes, like the embodiment shown in FIG. 2, the poppet valves 12 and 13, change-over valve 14 and throttles 15 and 16. The embodiment shown in FIG. 4 further includes passages connecting the throttles 15 and 16 at their outlet or downstream sides to the low-pressure line C, with pilot relief valves 24 and 25 being respectively mounted in one of the passages. However, the crossover relief valve 3 shown in FIG. 2 is dispensed with in FIG. 4. The setting pressure of the pilot relief valves 24 and 25 has a value such that a pressure high enough to keep the poppets 12c and 13c in closed condition until the main line pressures acting on the inlet chambers 12a and 13a reach an allowable maximum pressure is retained in the pressure chambers 12d and 13d of the poppet valves 12 and 13 respectively. Thus, when the internal pressure of the main line A or B exceeds the setting pressure of the pilot relief valve 24 or 25, the pilot relief valve 24 or 25 opens so that the pressure introduced into the pressure chamber 12d or 13d of the poppet valve 12 or 13 is kept at the aforesaid setting pressure. Meanwhile, the internal pressure of the main line A or B acts on the inlet chamber 12a or 13a of the poppet valve 12 or 13, so that the poppet valve 12 or 13 opens when the allowable maximum pressure is exceeded by the internal pressure of the main line A or B. Thus, by letting the flushing valve system 11 have a function like that of a balanced piston type relief valve, it is possible to eliminate the need to use the crossover relief valve 3 of a large capacity (shown in FIGS. 1-3) by using the pilot relief valves 24 and 25 of a small capacity.

In the embodiments shown in FIGS. 2 and 4, the low-pressure lines C and C' are connected directly to the tank 10 and are provided with no pressure reducing means so that the pressure in the pressure chambers 12d and 13d of the poppet valves 12 and 13, is reduced to the same level as the tank 10 when the pressure chambers 12d, 13d are in communication with the tank 10 through the low-pressure line C or C'. However, the invention is not limited to this arrangement. A suitable relief valve 5 in FIG. 1 or a suitable throttle may be used in the low-pressure line C or C' so that a predetermined pressure higher than that in the tank 10 will remain in the pressure chambers 12d, 13d of the poppet valve 12, 13 when the pressure chambers are in communication with the tank 10. If this is the case, the preload of the springs 12e and 13e of the poppet valves 12, 13 may be decreased.

Figure 5:
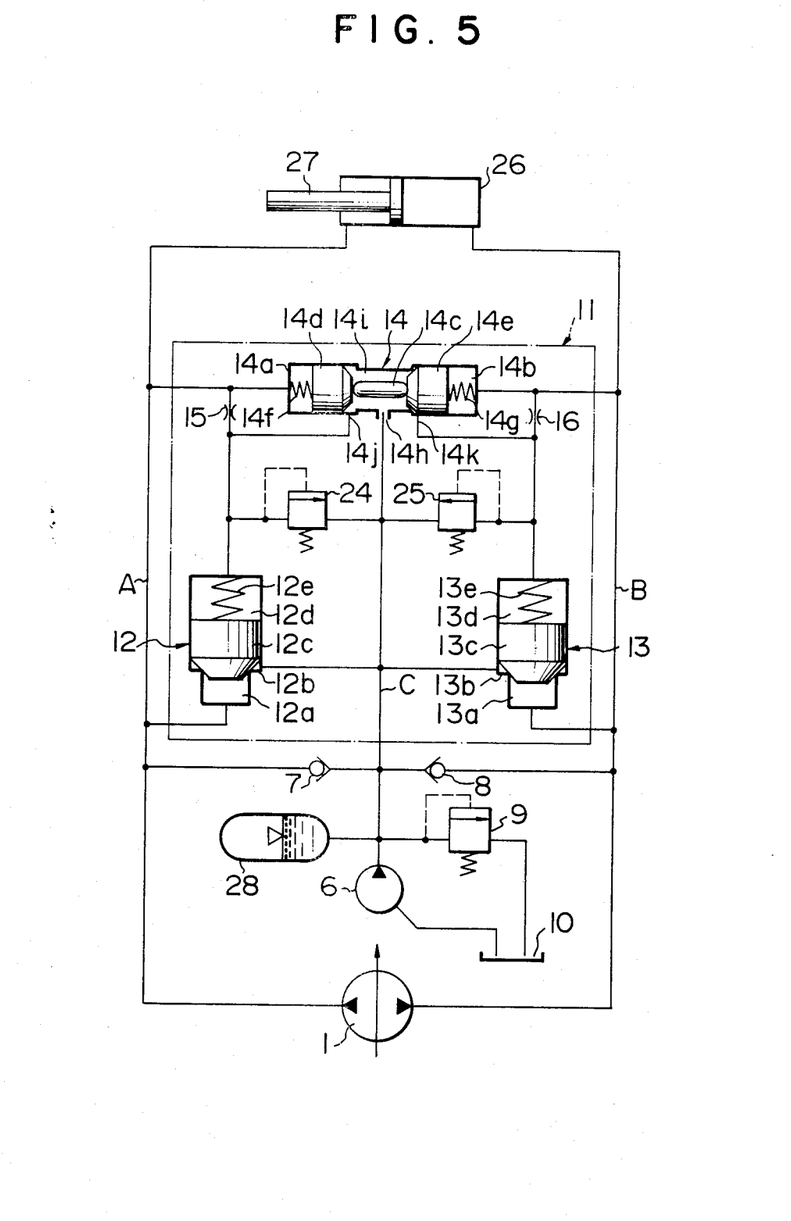

The flushing valve system according to the present invention can be used not only in a closed hydrostatic power transmission with a hydraulic pump but also in that with a single rod cylinder. FIG. 5 shows an embodiment of the invention in which a single rod cylinder 26 is used in place of the hydraulic motor 2 of the embodiment shown in FIG. 4. In addition, in the embodiment of FIG. 5, the low-pressure line C connected to the poppet valves 12 and 13 and the change-over valve 14 is connected to the discharge line of the charge pump 6 so that it is connected to the tank 10 through the relief valve 9. An accumulator 28 is also connected to the discharge line of the charge pump 6.

The operation of the embodiment of FIG. 5 will be described.

Suppose that the hydraulic pump 1 is discharging a pressure fluid into the main line A to move the piston 27 of the hydraulic cylinder 26 to the right, and that the main line A is the high pressure side main line, while the main line B is the low pressure side main line. At this time, the poppet valve 12 connected to the high pressure side main line A is in the closed condition in which the pressure in the main line A is introduced in the pressure chamber 12d, meanwhile the other poppet valve 13, connected to the low pressure side main line B, is in the open condition in which the pressure in the pressure chamber 13d is substantially the same as the discharge pressure of the pump 6 which is determined by the relief pressure of the relief valve 9. When the piston 27 is withdrawn into the cylinder 26 (moved to the right in FIG. 5), pressure fluid is discharged into the main line B from the cylinder 26 through its bottom side in a larger volume then that introduced from the main line A into the cylinder through its rod side, due to the difference in area between the rod hydraulic side and the bottom side of the single rod cylinder 26. This causes an excess to be produced in the working fluid in the closed hydraulic circuit including the main lines A and B, resulting in pressure rise in the low pressure side main line B. When the pressure in the main line B or in the inlet chamber 13a of the poppet valve 13 rises above a cracking pressure of the poppet valve 13 determined by the spring 13e and the pressure in the pressure chamber 13d, the poppet valve 13 is opened to allow the excess working fluid discharged from the low pressure side main line B to the low-pressure line C. A part of the excess fluid flowing into the low-pressure line C is discharged to the tank 10 through the relief valve 9 and the reminder is stored in the accumulator 28.

When the flow rate of the hydraulic pump 1 is suddenly decreased in order to stop the movement of the piston of the hydraulic cylinder 26, there would occur sudden changes in pressure in the main lines A and B. As explained in the embodiment of FIG. 2, the flushing valve system 11 can rapidly respond to the changes in the main line pressures. Thus, the hydraulic cylinder 26 is operated rapidly in response to the change in flow rate of the discharged fluid from the hydraulic pump.

On the other hand, during a movement of the piston 27 to the left, there is a lack of working fluid in the closed hydraulic circuit. Working fluid is supplied from the accumulator and the charge pump 6. The use of the accumulator 28 makes it possible to reduce the capacity of the charge pump 6.

As is clear from the above description, the embodiment shown in FIG. 5 is capable of improving the responsiveness of a hydrostatic power transmission and avoiding cavitation development by utilizing the high switching speed of the flushing valve system 11, like the embodiments shown in FIGS. 2-4. In addition, the embodiment of FIG. 5 has additional advantages which will be described.

The rightward movement of the piston 27 of the single rod cylinder 26 causes an excess to be produced in the working fluid, which is discharged through one of the poppet valves into the low-pressure line C. During the time the piston 27 of the single rod cylinder 26 is being withdrawn (moved to the right in FIG. 5) into the cylinder 26, it is possible that the direction in which a load is applied may suddenly be reversed. For example, while the load is being driven by the piston 27, the piston 27 may inadvertently be pushed by the load. When this happens, the main line A which has been on the higher pressure side would become a main line on the lower pressure side, and the main line B would become a main line on the higher pressure side. If the spool type flushing valve 4 of the prior art shown in FIG. 1 were used in place of the flushing valve system 11, switching would be effected as the flushing valve 4 passes through the neutral position shown in FIG. 1 in accordance with a change in the pressure in the main lines A,B. However, when the flushing valve 4 is neutral in position, the two inlet ports 4j and 4k are both out of communication with the outlet port 4l, so that the excess pressure fluid produced by the withdrawing of the piston 27 into the cylinder 26 would have no place to go and would be trapped in the closed hydraulic circuit. Thus, the piston 27 would be suddenly brought to a stop and an inordinately high pressure would be generated in the closed hydraulic circuit, thereby giving a shock to the transmission.

In the embodiment shown in FIG. 5, during the time the flushing valve system 11 is being switched or when the change-over valve 14 is brought to the neutral position, the pressure chambers 12d and 13d of the poppet valves 12 and 13 are communicated with the low-pressure line C. Thus, when the pressure in the main lines A and B becomes higher than the cracking pressure of the poppet valves 12 and 13, pressure fluid flows from the main lines A and B to the fluid tank 10, thereby avoiding trapping of the excess pressure fluid in the closed hydraulic circuit.

In the embodiment of FIG. 5, the low-pressure line C is connected to the tank 10 through the relief valve 9. It should be noted, however, that the line C may be directly connected to the tank 10.

In the embodiments shown in FIGS. 2, 4 and 5, the low-pressure line C is communicated with the pressure chambers 12d and 13d of the two poppet valves 12 and 13 when the change-over valve 14 is in the neutral position. However, the invention is not limited to this arrangement and the line C may be connected to one of them to achieve the desired effect.

From the foregoing description, it will be appreciated that according to the invention a poppet valve 12, 13 is mounted between each main line A, B and the fluid tank 10 and pressure differential responding means is used to bring the poppet valve communicated with the main line on the higher pressure side to the closed condition and the poppet valve communicated with the main line on the lower pressure side to the openable condition. By this feature, the switching speed of the flushing valve system 11 can be increased and fluid leaks can be minimized. Thus, it is possible to avoid cavitation development without increasing the capacity of the charge pump 6 or decreasing the changing rate of the delivery by the variable displacement hydraulic pump 1.

What is claimed is:

1. In a closed circuit hydrostatic power transmission comprising a variable displacement hydraulic pump, a hydraulic actuator, first and second main lines connecting said variable displacement hydraulic pump and said hydraulic actuator together in a closed hydraulic system, a fluid tank, and fluid replenishing means connected to said first and second main lines for replenishing them with the working fluid from said fluid tank, the flushing valve system interposed between said first and second main lines and said fluid tank and operative, when a predetermined level of pressure differential is produced between said first and second main lines, to bring the main line on a lower pressure side into communication with the fluid tank and a main line on a higher pressure side out of communication therewith, said flushing valve system comprising:

a first poppet valve located between said first main line and the fluid tank for bringing the first main line and the fluid tank into and out of communication with each other;

a second poppet valve located between the second main line and the fluid tank for bringing the second main line and the fluid tank into and out of communication with each other;

each of said poppet valves comprises an inlet chamber connected to the main lines, an outlet chamber connected to the fluid tank, a valve seat interposed between said inlet chamber and said outlet chamber, a poppet cooperating with said valve seat to bring said inlet chamber and said outlet chamber into and out of communication with each other, said poppet being urged by an internal pressure of the inlet chamber in a direction away from the valve seat, spring means for urging said poppet to move toward said valve seat by a biasing force thereof, and means comprising a pressure chamber for exerting a force corresponding to the internal pressure of said pressure chamber on said poppet to urge the poppet toward the valve seat; and pressure differential responding means including two pressure sensing means respectively communicating with the first and second main lines, two change-over ports communicating the respective pressure chambers of the poppet valves and a common port communicating with the fluid tank for enabling the change-over port to communicate with the pressure chamber of the poppet valve located between the main line on the higher pressure side and the tank to be brought into communication with the common port and the change-over port communicating with the pressure chamber of the poppet valve located between the main line on the lower pressure side and the tank to be brought out of communication with the common port.

2. A flushing valve system as claimed in claim 1, wherein said pressure differential responding means comprises a solenoid-operated directional control valve having two inlet ports and two outlet ports, a first passage connecting one of said two inlet ports to the two main lines through check valves respectively, a second passage connecting the other inlet port to the fluid tank, a third passage respectively and a fourth passage connecting said two outlet ports to the pressure chambers of said first and second poppet valves, pressure sensors each changing a pressure in one of the main lines to an electric signal, and control means responsive to the electric signals from the pressure sensors to control the solenoid-operated directional valve.

3. A flushing valve system as claimed in claim 1, wherein said hydraulic actuator comprises a single rod cylinder.

4. A flushing valve system as claimed in claim 1, wherein said pressure differential responding means comprises a first passage connecting the first main line to the pressure chamber of the first poppet valve and mounting a throttle therein, a second passage connecting the second main line to the pressure chamber of the second poppet valve and having a throttle mounted therein.

5. In a closed circuit hydrostatic power transmission comprising a variable displacement hydraulic pump, a hydraulic actuator, first and second main lines connecting said variable displacement hydraulic pump and said hydraulic actuator together in a closed hydraulic circuit, a fluid tank, and fluid replenishing means connected to said first and second main lines for replenishing them with working fluid from said fluid tank, a flushing valve system interposed between said first and second main lines and said fluid tank and operative, when a predetermined level of pressure differential is produced between said first and second main lines, to bring the main line on a lower pressure side into communication with a fluid tank and a main line on a higher pressure side out of communication therewith, said flushing valve system comprising:

a first poppet valve located between the first main line and the fluid tank for bringing the first main line and the fluid tank into and out of communication with each other;

a second poppet valve located between the second main line and the fluid tank for bringing the second main line and the fluid tank into and out of communication with each other;

pressure differential responding means responsive to the pressure differential between the first and second main line to bring the poppet valve communicating with the main line on the higher pressure side to a closed position and the poppet valve communicating with the main line on the lower pressure side to an operable condition;

each of said poppet valves comprising an inlet chamber connected to the main lines and an outlet chamber connected to the fluid tank, a valve seat interposed between said inlet chamber and said outlet chamber, a poppet cooperating with said valve seat to bring said inlet chamber and said outlet chamber into and out of communication with each other, said poppet being urged by an internal pressure of the inlet chamber in a direction away from the valve seat, spring means for urging said poppet to move toward said valve seat by a biasing force thereof, and means comprising a pressure chamber for exerting a force corresponding to the internal pressure of said pressure chamber on said poppet to urge said poppet toward said valve seat;

said pressure differential responding means comprising means comprising means responsive to the pressure differential between the first and second main lines to establish a high pressure substantially the same as that in the main line on the higher pressure side in the pressure chamber of the poppet valve associated therewith and to release the pressure in the pressure chamber of the other poppet valve to a predetermined low level, said pressure differential responding means comprising a first passage connecting the first main line to the pressure chamber of the first poppet valve and mounting a throttle therein, a second pressure connecting the second main line to the pressure chamber of the second poppet valve and having a throttle mounted therein, and a change-over valve actuated by the pressure differential between the main lines to bring one of the pressure chamber of the first and second poppet valves into communication with the fluid tank; and wherein said change-over valve comprises a change-over chamber, a common port bringing said change-over chamber into communication with the fluid tank, a first change-over port bringing said change-over chamber into communication with the pressure chamber of said first poppet valve, a second change-over port bringing said change-over chamber into communication with the pressure chamber of said second poppet valve, a first poppet and a second poppet positioned against opposite ends of said change-over chamber for respectively bringing said common port into and out of communication with said first change-over port and said second change-over port, connecting means connecting said first poppet and said second poppet to cause, when one of said poppets brings the change-over port adjacent thereto out of communication with the common port, the other poppet to bring the other change-over port into communication with the common port, a first pressure chamber operatively to apply the first main line to the first poppet to bias the same toward the second poppet, and a second pressure chamber operative to apply the pressure in the second main line to the second poppet to bias the same toward the first poppet.

6. A flushing valve system as claimed in claim 4 or 4, further comprising additional passages respectively connecting the throttles downstream ends of to the fluid tank, and pilot relief valves each mounted in one of said additional passages.

* * * * *